(12) United States Patent
Krisher

(10) Patent No.: US 7,857,723 B2
(45) Date of Patent: Dec. 28, 2010

(54) TRANSAXLE UNIT WITH INTEGRATED POWER TAKE-OFF UNIT AND TORQUE COUPLING DEVICE

(75) Inventor: James A. Krisher, Fort Wayne, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 1609 days.

(21) Appl. No.: 11/142,366

(22) Filed: Jun. 2, 2005

(65) Prior Publication Data

US 2006/0283654 A1  Dec. 21, 2006

(51) Int. Cl.
  *F16H 48/02* (2006.01)
(52) U.S. Cl. .......................................... 475/88; 475/150
(58) Field of Classification Search ................... 475/88, 475/150
  See application file for complete search history.

(56) References Cited

U.S. PATENT DOCUMENTS

| | | | |
|---|---|---|---|
| 4,452,100 A * | 6/1984 | Sullivan et al. ................ | 475/88 |
| 4,693,334 A | 9/1987 | Hiraiwa | |
| 4,727,966 A * | 3/1988 | Hiramatsu et al. ............. | 477/35 |
| 4,815,336 A | 3/1989 | Katayama et al. | |
| 4,862,769 A | 9/1989 | Koga et al. | |
| 4,875,978 A | 10/1989 | Hiketa | |
| 5,041,069 A * | 8/1991 | Horst ......................... | 475/231 |
| 5,071,396 A | 12/1991 | Kobayashi | |
| 5,098,352 A | 3/1992 | Montanaro et al. | |
| 5,146,801 A | 9/1992 | Oda | |
| 5,167,293 A | 12/1992 | Park et al. | |
| 5,234,072 A | 8/1993 | Chludek | |
| 5,303,797 A | 4/1994 | Niikura | |
| 5,547,430 A | 8/1996 | Gasch | |
| 6,001,043 A | 12/1999 | Yun | |
| 6,135,229 A | 10/2000 | Arimatsu | |
| 6,183,387 B1 * | 2/2001 | Yoshioka ...................... | 475/88 |
| 6,491,126 B1 * | 12/2002 | Robison et al. ............. | 180/233 |
| 6,668,961 B2 | 12/2003 | Bowen et al. | |
| 6,692,396 B1 * | 2/2004 | Grogg et al. .................. | 475/86 |
| 6,719,660 B2 | 4/2004 | Palazzolo | |
| 6,902,506 B2 * | 6/2005 | Schrand ........................ | 475/86 |
| 7,210,566 B2 * | 5/2007 | Baxter, Jr. ..................... | 192/35 |
| 2003/0186772 A1 * | 10/2003 | Grogg et al. ................ | 475/198 |

* cited by examiner

*Primary Examiner*—Sherry Estremsky
(74) *Attorney, Agent, or Firm*—Marshall & Melhorn LLC

(57) ABSTRACT

A transaxle unit comprises a differential assembly having a differential mechanism, a power take-off unit and a torque-coupling device for selectively restricting differential rotation of a differential mechanism. The torque-coupling device includes a friction clutch assembly for selectively frictionally engaging and disengaging a differential case and one of output axle shafts and a hydraulic clutch actuator. The hydraulic clutch actuator includes a hydraulic pump and a variable pressure relief valve assembly fluidly communicating with the hydraulic pump to selectively control a hydraulic pressure generated by the hydraulic pump. The variable pressure relief valve assembly comprises a valve closure member, a valve seat complementary to the valve closure member and an electro-magnetic actuator for engaging the valve closure member and generating a variable electro-magnetic force urging selectively vary a release pressure of the pressure relief valve assembly based on a magnitude of an electric current supplied to the electro-magnetic actuator.

18 Claims, 8 Drawing Sheets

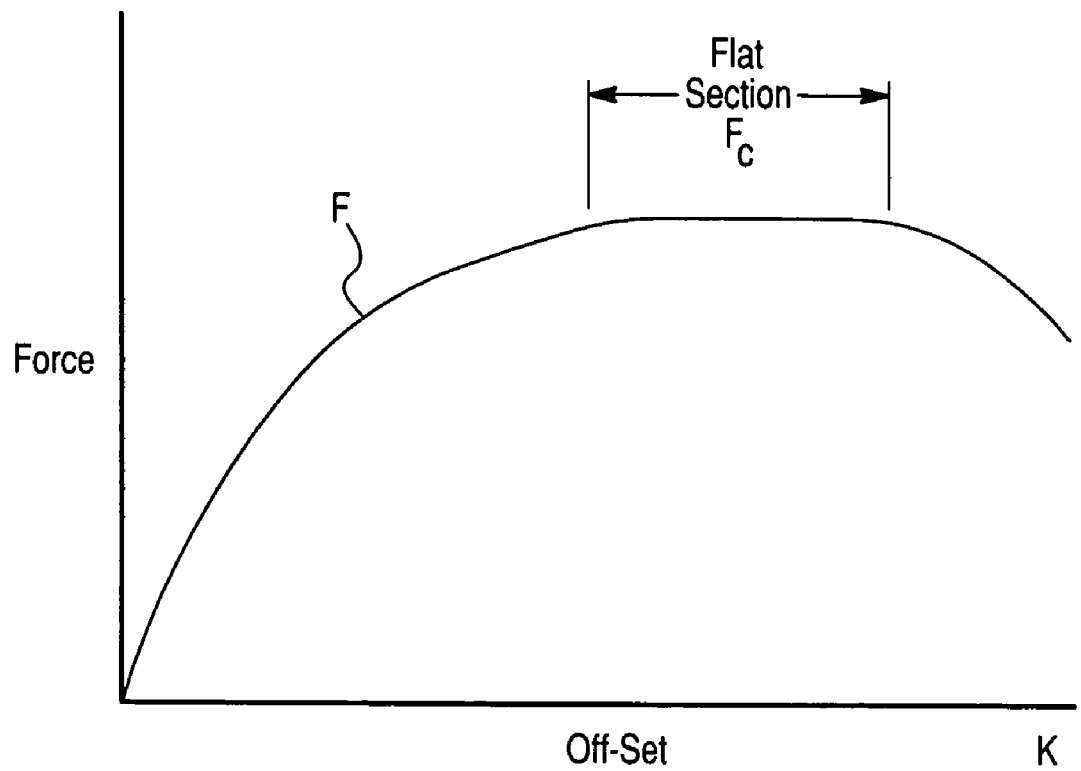

TRANSAXLE UNIT WITH INTEGRATED POWER TAKE-OFF UNIT AND TORQUE COUPLING DEVICE

BACKGROUND OF THE INVENTION

1. Field of the Invention

The present invention relates to transaxle units of motor vehicles in general, and more particularly to a transaxle unit provided with an integrated power take-off unit and torque-coupling device.

2. Description of the Prior Art

Recently, there has been a significant increase in the demand for all-wheel-drive (AWD) motor vehicles equipped with a powertrain capable of providing drive torque to all four wheels. Traditional AWD vehicles are equipped with a longitudinally-extending engine and transmission that deliver power to the input of a transfer case which, in turn, distributes the power to front and rear drive axles. As is known, some transfer cases are equipped with a transfer clutch for automatically transferring power to the front drive axle during lost traction situations to establish an "on-demand" all-wheel drive mode. Other transfer cases are equipped with an inter-axle differential which functions to transmit power to both drive axles during normal conditions at a predetermined torque distribution ratio so as to establish a full-time all-wheel drive mode. Such AWD vehicles are typically based on a rear wheel drive arrangement and, as such, are generally limited to SUV's and trucks.

To provide drive torque to the rear wheels in front-wheel-drive (FWD) motor vehicles, a front-wheel drive transaxle has to be modified by adding a power take-off unit (PTU) driven by the output of the FWD transaxle and supplying power to the rear drive axle. Moreover, it is desirable to provide the FWD transaxle with a limited-slip differential (LSD) assembly to improve vehicle's traction/handling capabilities. However, the LSD assemblies, especially those controlled by a friction clutch, are difficult to integrate into the FWD transaxle unit due to the packaging constraints.

Recently, a great deal of development effort has been directed at packaging the PTU into the FWD transaxle of the conventional FWD vehicles. Known FWD transaxle of the all-wheel drive motor vehicles are susceptible to improvements that may enhance their performance and cost. With this in mind, a need exists to develop an improved FWD transaxle unit of an all-wheel drive motor vehicle that is compact in size, can be packaged into existing front-wheel drive vehicles, and minimizes the FWD transaxle unit redesign, tooling and manufacturing expenses, thus advancing the art.

SUMMARY OF THE INVENTION

The present invention provides an improved transaxle unit of an all wheel drive (AWD) motor vehicle.

The transaxle unit in accordance with the present invention comprises a differential assembly having a differential mechanism disposed in a differential case and two opposite output axle shafts outwardly extending from the differential case, a power take-off unit drivingly coupled to the differential case, and a torque-coupling device for selectively restricting differential rotation of the differential mechanism. In turn, the torque-coupling device includes a friction clutch assembly for selectively frictionally engaging and disengaging the differential case and one of the output axle shafts, and a hydraulic clutch actuator for selectively frictionally loading the friction clutch assembly.

The clutch assembly comprises at least one first friction member non-rotatably coupled to the differential case and at least one second friction member non-rotatably coupled to one of the output shafts so that the friction members are frictionally engageable with one another. The hydraulic clutch actuator includes a hydraulic pump for generating a hydraulic pressure to frictionally load the friction clutch assembly and a variable pressure relief valve assembly fluidly communicating with the hydraulic pump to selectively control the hydraulic pressure. The variable pressure relief valve assembly comprises a valve closure member, a valve seat complementary to the valve closure member, and an electro-magnetic actuator for engaging the valve closure member and generating a variable electro-magnetic force urging the valve closure member against the valve seat so as to selectively vary a release pressure of the pressure relief valve assembly based on a magnitude of an electric current supplied to the electro-magnetic actuator.

Such an arrangement of the vehicular transaxle unit allows to readily modify a front-wheel-drive (FWD) powertrain architecture into an all-wheel-drive, minimizes the FWD transaxle unit redesign, tooling and manufacturing expenses, and provides active control of the differential assembly. The integrated power take-off unit and a torque-coupling device of the present invention can be integrated into the transaxle unit without any substantial modification thereof. Moreover, the torque capacity of the torque-coupling device can be actively controlled electronically to match various vehicle operating conditions.

BRIEF DESCRIPTION OF THE DRAWINGS

Other objects and advantages of the invention will become apparent from a study of the following specification when viewed in light of the accompanying drawings, wherein:

FIG. 8 is a graph showing an axial force applied upon a valve closure member of the variable pressure relief valve assembly shown in FIG. 6 by an electro-magnetic actuator as a function of "off-set" between a coil housing and an armature.

DETAILED DESCRIPTION OF PREFERRED EMBODIMENTS

The preferred embodiment of the present invention will now be described with the reference to accompanying drawings.

Figure 1:
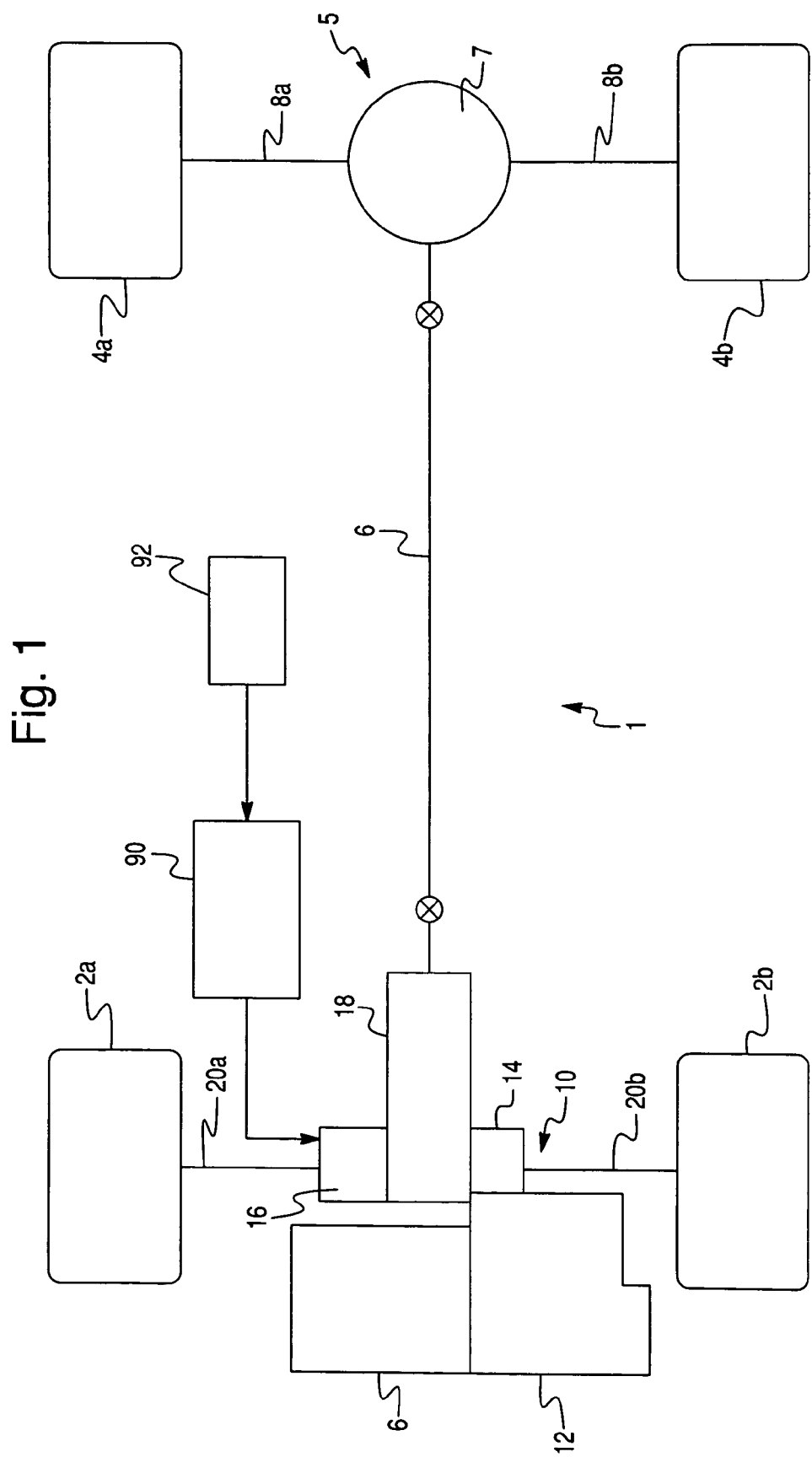
FIG. 1 is a schematic diagram showing a drivetrain of an all-wheel drive motor vehicle in accordance with a preferred embodiment of the present invention.

The present invention is directed to a front-wheel-drive transaxle unit with an integrated power take-off unit (PTU) and torque-coupling device for use in an all-wheel drive or four-wheel-drive motor vehicle equipped with an mounted engine and transmission and which is arranged to provide a full-time four-wheel drive mode of operation. The specific arrangement of the front-wheel-drive transaxle unit of the present invention provides a compact package which permits use of the power take-off unit in a wide variety of all-wheel drive vehicles. Although, the preferred embodiment of the present invention is described with the reference to the front-wheel-drive transaxle unit, it will be appreciated that the present invention is equally applicable to a rear-wheel-drive transaxle unit FIG. 1 schematically depicts a drivetrain 1 of an all-wheel drive (AWD) or four-wheel-drive (4WD) motor vehicle in accordance with the preferred embodiment of the present invention. The AWD drivetrain 1 comprises a pair of front drive wheels 2a and 2b, a pair of rear drive wheels 4a and 4b and a front-wheel-drive (FWD) transaxle unit 10 positioned between the two front wheels 2a and 2b. The FWD transaxle unit 10 is operatively connected to a prime mover 6, such as an internal combustion engine, electric motor, etc.

The FWD transaxle unit 10 is a drive setup in which a power transmission 12, a final drive, and a front differential assembly 14 are combined into a single unit connected directly to the engine 6. The FWD transaxles are commonly used in front wheel drive motor vehicles. The power transmission 12 is commonly known in the art as a mechanical unit containing a manual or automatic change-speed gear system and associated actuating machinery. An output from the power transmission 12 is connected to the front differential assembly 14 through the final drive. The front differential assembly 14 is drivingly connected to right-hand and left-hand front output axle shafts 20a and 20b, respectively. In turn, the output axle shafts 20a and 20b drive the front wheels 2a and 2b, respectively, through suitable coupling means, such as constant-velocity joints (not shown).

Figure 2:
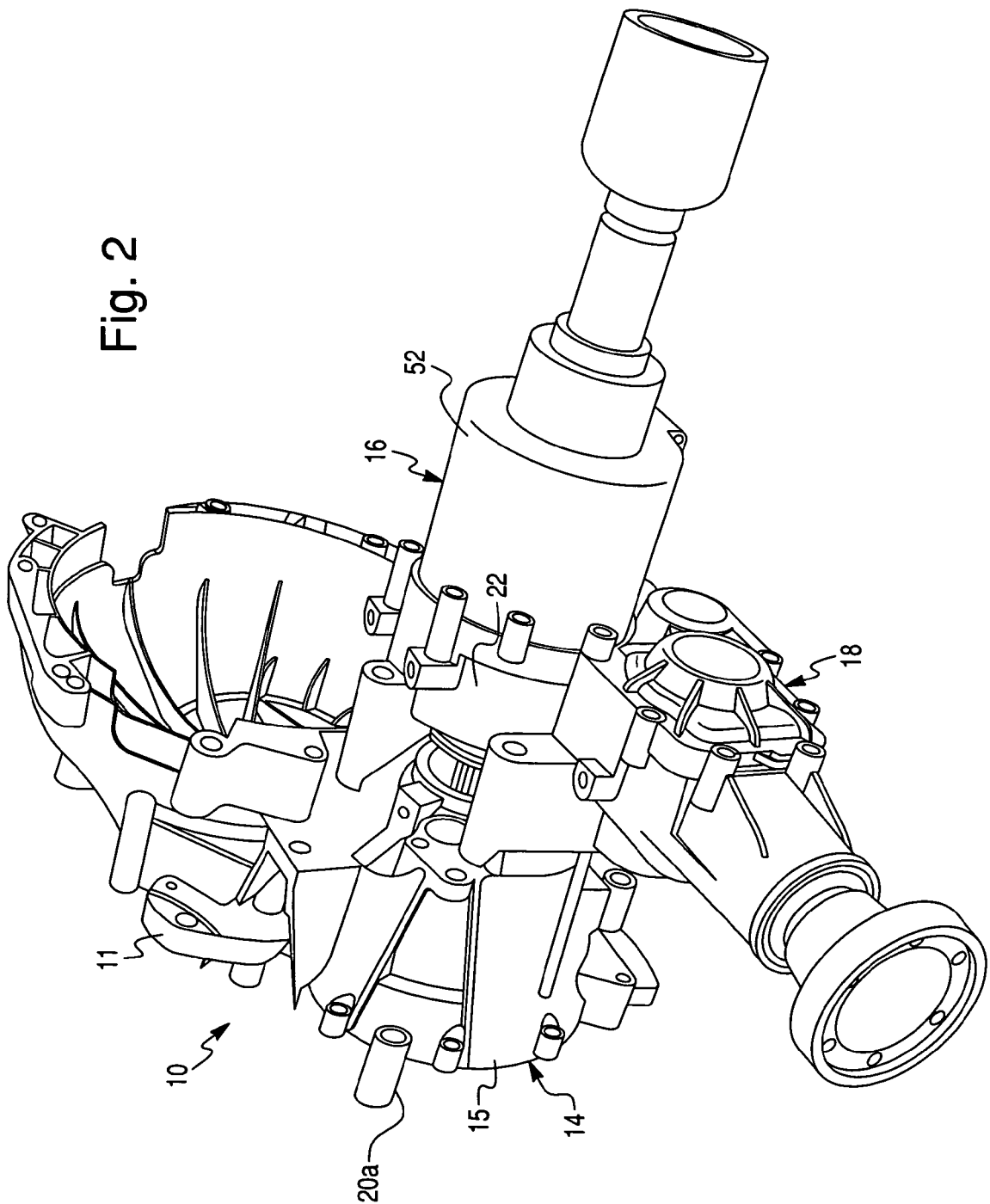
FIG. 2 is a perspective view of a front-wheel-drive transaxle unit in accordance with the preferred embodiment of the present invention.
Figure 3:
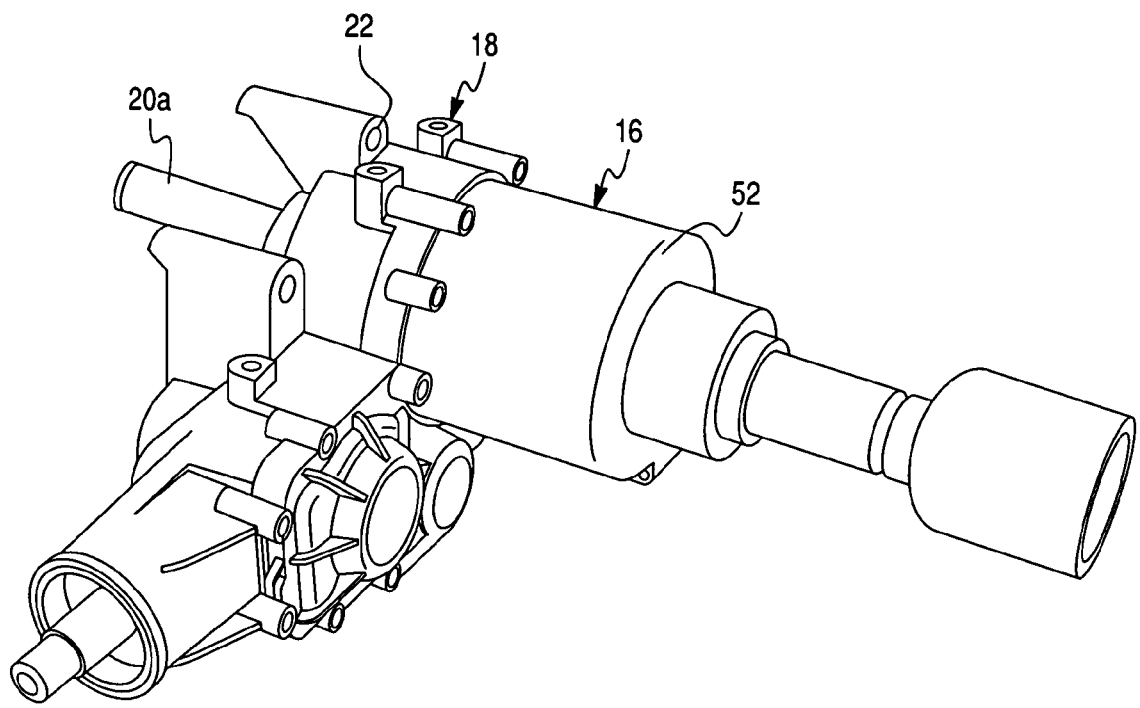
FIG. 3 is a perspective view of integrated torque-coupling device and power take-off unit in accordance with the preferred embodiment of the present invention.

As illustrated in FIGS. 1-3, the FWD transaxle unit 10 further includes an integrated torque-coupling device 16 and power take-off unit (PTU) 18. The torque-coupling device 16 is provided for selectively restricting differential rotation of the front differential assembly 14, i.e. of the output axle shafts 20a and 20b, and the PTU 18 is adapted for use in a full-time AWD system and is operable to transfer drive torque from the prime mover 6 and the power transmission 12 at a predetermined distribution ratio to the rear wheels 4 of a rear drive axle 5 through a propeller shaft 6, a rear differential assembly 7 and rear axle shafts 8a and 8b.

Figure 4:
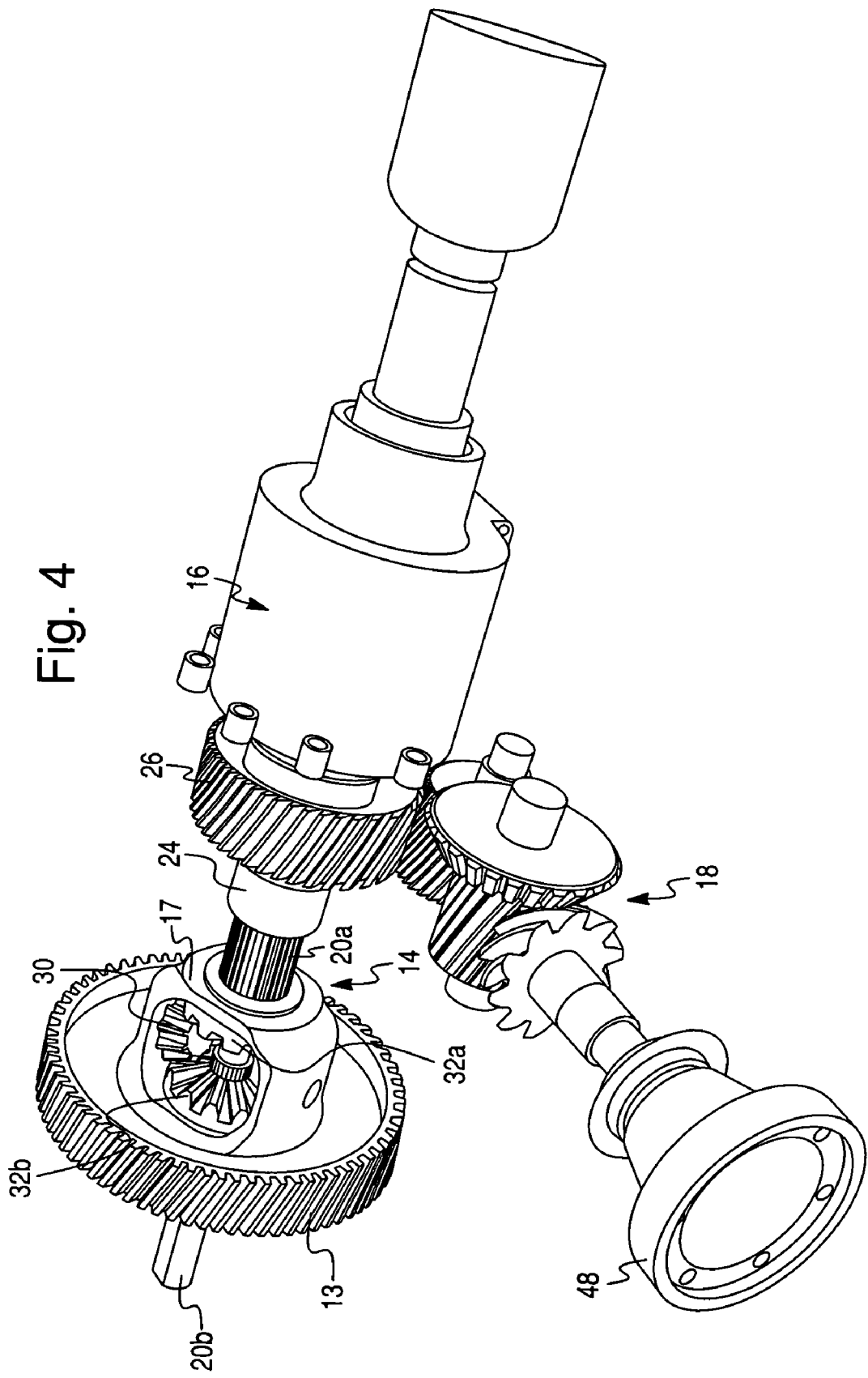
FIG. 4 is a partial perspective view of the front-wheel-drive transaxle unit in accordance with the preferred embodiment of the present invention showing a differential assembly and the integrated torque-coupling device and power take-off unit.

FIG. 4 of the drawings illustrates in detail the preferred arrangement of the differential assembly 14, the torque-coupling device 16 and the PTU 18 in accordance with the present invention. Reference numeral 17 defines a differential case supported in a differential housing 15 through appropriate roller bearings (not shown) for rotation about a longitudinal axis 21 (shown in FIG. 5). The differential case 17 is driven by a driving gear 13 drivingly coupled to an output shaft (not shown) of the power transmission 12. The differential assembly 14 includes a differential mechanism having a set of pinion gears 30 rotatably supported on a pinion shaft secured to the differential case 15. The pinion gears 30 engage a pair of opposite side gears 32a and 32b splined to proximal ends of the output axle shafts 20a and 20b, respectively. Preferably, the differential housing 15 is an integral part of a transaxle housing 11.

The PTU 18 is disposed outside the differential case 17. Preferably, the PTU 18 is disposed outside the differential housing 15 and within a PTU housing 22, as illustrated in FIGS. 2-5. The PTU housing 22 is secured to the differential housing 15 by an appropriate means, such as threaded fasteners. As further illustrated in FIGS. 4 and 5, the PTU 18 includes a transfer shaft 24 that is supported on the front output axle shaft 20a or rotation about the longitudinal axis 21 (shown in FIG. 5). A first transfer gear 26 is formed on the transfer shaft 24 integrally therewith. The transfer shaft 24 is drivingly coupled to the differential case 15 at one end 24a thereof, such as through a spline connection, thus non-rotatably coupling the first transfer gear 26 with the differential case 15.

The first transfer gear 26 is part of a two gear helical gearset further including a second transfer gear 28 and a third transfer gear 30 that is meshed with both the first transfer gear 26 and the second transfer gear 28. The third transfer gear 30 is shown to be formed integrally with a first idler shaft 34 rotatably supported by a pair of laterally-spaced bearing assemblies 32 within the PTU housing 22. The second transfer gear 28 is fixed via a spline connection to a second idler shaft 36 is rotatably supported by a pair of laterally-spaced bearing assemblies 37 within the PTU housing 22. Also fixed to the second idler shaft 36 via a spline connection is a first bevel gear 38.

The first bevel gear 38 is part of a two component bevel gearset also including a second bevel gear 40 that is meshed with the first bevel gear 38 and is formed at one end of an output shaft 42 of the PTU 18. The PTU output shaft 42 is supported for rotation relative to PTU housing 22 by a pair of laterally-spaced bearing assemblies 44 and is sealed relative thereto via a resilient lipseal assembly 46. A yoke 48 is fixed via a spline connection 49 to the opposite end of output shaft 42 and is retained thereon within a lock nut 50.

As illustrated in FIGS. 2-5, the torque-coupling device 16 is disposed outside the differential case 17. Preferably, the torque-coupling device 16 is disposed outside the differential housing 15 and within a coupling housing 52. The coupling housing 52 is secured to the PTU housing 22 by ant appropriate means, such as threaded fasteners. Thus, the PTU housing 22 is mounted between the differential housing 15 and the coupling housing 52. The output axle shaft 20a is supported within the coupling housing 52 for rotation about the longitudinal axis 21 through an anti-friction bearing 53. In other words, the torque-coupling device 16 is mounted coaxially to the differential assembly 14. Such an arrangement of the integrated torque-coupling device 16 and the PTU 18 minimizes the FWD transaxle unit redesign, tooling and manufacturing expenses.

Figure 5:
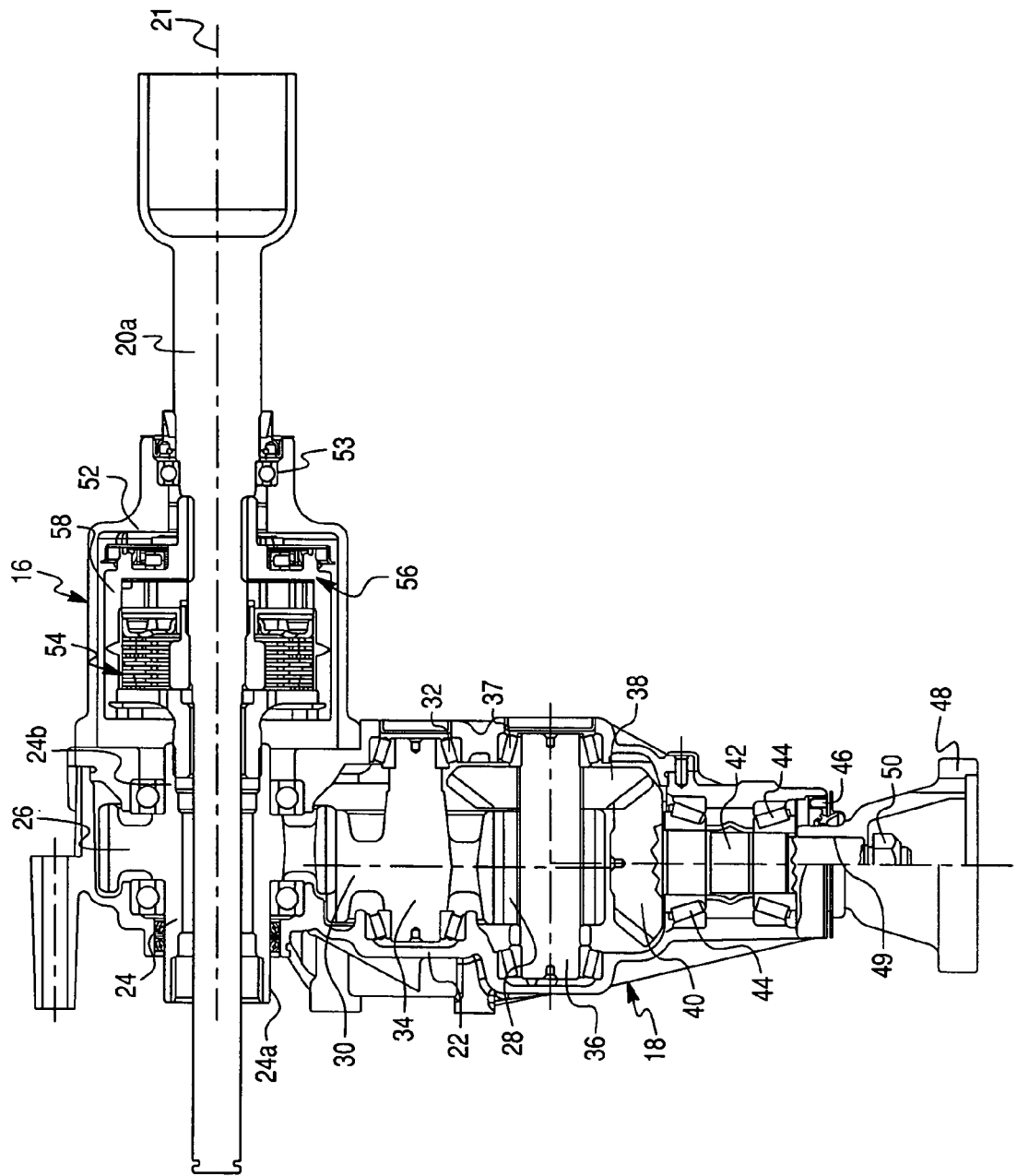
FIG. 5 is a cross-sectional view of the integrated torque-coupling device and power take-off unit in accordance with the preferred embodiment of the present invention.

As further illustrated in detail in FIG. 5, the selectively operable, hydraulically actuated torque-coupling device 16 includes a limited slip device in the form of a hydraulically actuated friction clutch assembly 54 for selectively frictionally engaging and disengaging the differential case 17 and the output axle shaft 20a, and a hydraulic clutch actuator 56 for selectively frictionally loading the friction clutch assembly 54. In turn the hydraulic clutch actuator includes a hydraulic pump to generate a hydraulic pressure to frictionally load the friction clutch assembly and a variable pressure relief valve assembly fluidly communicating with the hydraulic pump to selectively control the hydraulic pressure.

The hydraulically actuated friction clutch assembly 54 is disposed within a clutch casing 58 for selectively frictionally coupling the output axle shaft 20*a* to the clutch casing 58. The clutch casing 58 is rotatably supported by an anti-friction bearing assembly 57 within the coupling housing 52. Moreover, the clutch easing 58 is drivingly coupled to the transfer shaft 24 of the PTU 18 through a spline connection between a flange portion 59 (shown in FIG. 6) of the clutch casing 58 and a second end 24*b* of the transfer shaft 24, thus drivingly coupling the clutch casing 58 to the differential case 17 through the transfer shaft 24 of the PTU 18.

The friction clutch assembly 54 comprises at least one first friction member non-rotatably coupled to the clutch casing 58 (thus, to the differential case 17 through the transfer shaft 24) and at least one second friction member non-rotatably coupled to of the output axle shaft 20*a*. In accordance with the preferred embodiment of the present invention, the friction clutch assembly 54 is hydraulically actuated multi-plate clutch assembly including a friction clutch pack 60. As further illustrated in detail in FIG. 6, the friction clutch pack 60, well known in the prior art, includes sets of alternating first friction plates (or members) 60*a* and second friction plates (or members) 60*b* mounted about the output axle shaft 20*a*. Conventionally, an outer circumference of the first friction plates 60*a* is provided with projections that non-rotatably engages corresponding grooves formed in the clutch casing 58. Similarly, an inner circumference of the second friction plates 60*b* is provided with projections that non-rotatably engage corresponding grooves formed in a spline collar 61. In turn, the spline collar 61 is mounted about the output axle shaft 20*a* and drivingly coupled thereto through a spline connection. At the same time, both the outer friction plates 60*a* and the second friction plates 60*b* are slideable in the axial direction. The first clutch plates 60*a* frictionally engage the second clutch plates 60*b* to form a torque coupling arrangement between the clutch casing 58 and the output axle shaft 20*a*.

Furthermore, the hydraulic clutch actuator 56 selectively actuates the clutch assembly 54. Preferably, the hydraulic clutch actuator 56 includes a speed sensitive positive displacement hydraulic pump 62 providing a pressurized hydraulic fluid, a piston assembly 64 for axially loading the clutch pack 60, and a variable pressure relief valve assembly 66 for selectively controlling a discharge pressure of the pump 62 and, subsequently, the clutch pack 60.

The variable pressure relief valve assembly 66 is operated by an electro-magnetic (preferably, solenoid) actuator electronically controlled by a coupling control module (CCM) 90 (shown in FIG. 1) based on one or more vehicle parameters as control inputs 92, such as a vehicle speed, a wheel speed difference, vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). When energized, the variable pressure relief valve assembly 66 is capable of continuously modulating a discharge pressure of the pump 62 in a variable range from a minimum pressure to a maximum pressure, thereby selectively and variably controlling torque transferred through the friction clutch assembly 54 in a range from a minimum torque value to a maximum torque value. Thus, the torque-coupling device 16 allows to selectively and variably controlling the speed differential between the right and left front wheels 2*a* and 2*b* of the motor vehicle.

Figure 6:
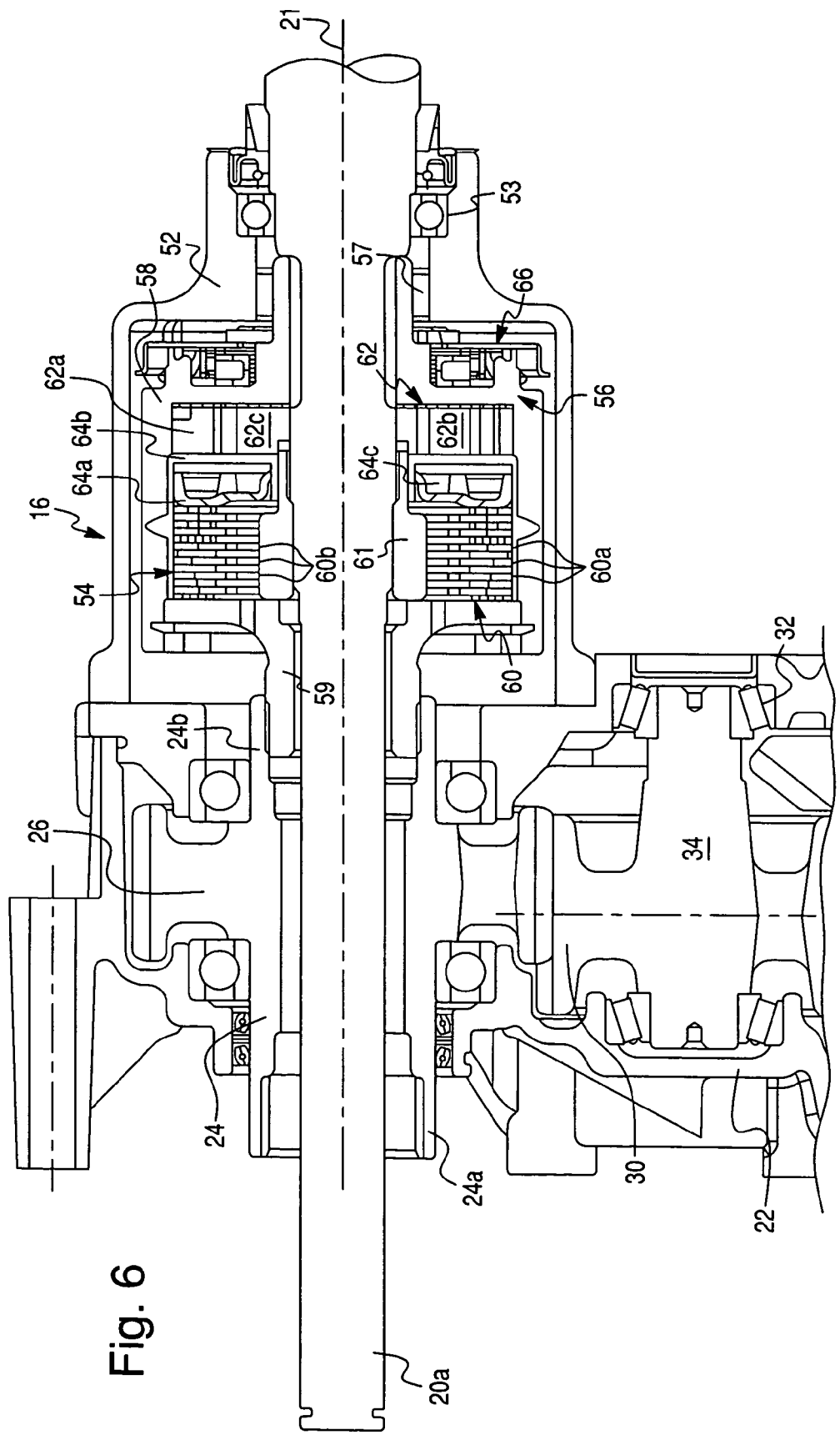
FIG. 6 is an enlarged sectional view of the torque-coupling device in accordance with the preferred embodiment of the present invention in accordance with the preferred embodiment of the present invention.

The speed sensitive hydraulic displacement pump 62 disposed within the clutch casing 58 actuates the clutch pack 60 when the relative rotation between the output axle shaft 20*a* and the differential case 17, or between the output axle shafts 20*a* and 20*b*, occurs. It will be appreciated that a hydraulic pressure generated by the pump 62 is substantially proportional to a rotational speed difference between the output axle shaft 20*a* and the differential case 17. Preferably, the hydraulic displacement pump 62 employed to provide pressurized hydraulic fluid to actuate the clutch pack 60 is a bi-directional gerotor pump. As shown in FIG. 6, the gerotor pump 62 includes an outer ring member 62*a*, an outer rotor 62*b*, and an inner rotor 62*c*. The inner rotor 62*c* drivingly coupled (i.e., keyed or splined) to the output axle shaft 20*a*, and the outer ring member 62*a* is secured (i.e., keyed or splined) to the clutch casing 58. The inner rotor 62*c* has a plurality of external teeth that rotate concentrically relative to the output axle shaft 20*a* about the axis 21. The outer rotor 62*b* includes a plurality of internal teeth and has an outer circumferential edge surface that is rotatably supported within a circular internal bore formed in the outer ring member 62*a*. Preferably, the inner rotor 62*c* has one less tooth than the outer rotor 62*b* and when relative rotation between the inner rotor 62*c* and the outer ring member 62*a* occurs, it causes eccentric rotation of the outer rotor 62*b*, which can freely rotate within the outer ring member 62*a* eccentrically with respect to the inner rotor 62*c*, thus providing a series of decreasing and increasing volume fluid pockets by means of which fluid pressure is created. Therefore, when relative motion takes place between the output axle shaft 20*a* and the differential case 17, the inner rotor 62*c* of the gerotor pump 62 generates hydraulic fluid pressure. However, it will be appreciated that any other appropriate type of hydraulic pump generating the hydraulic pressure in response to the relative rotation between the output axle shaft 20*a* and the differential case 15 is within the scope of the present invention.

The piston assembly 64 including a hydraulically actuated piston 64*a* disposed within a piston housing 64*b*, serves to compress the clutch pack 60 and retard any speed differential between the output axle shafts 20*a* and 20*b*. Pressurized hydraulic fluid to actuate the piston 64*a* and engage the clutch pack 60 is provided by the gerotor pump 62. In such an arrangement, when a speed difference between the output axle shafts 20*a* and t20*b* exists, the hydraulic fluid is drawn into the pump 62 through a suction passage. The gerotor pump 62 pumps the pressurized fluid into a piston pressure chamber 64*c* defined between the piston 64*a* and the piston housing 64*b* to actuate the clutch pack 60. As the speed difference increases, the pressure increases. The pressurized fluid in the piston pressure chamber 64*c* creates an axial force upon the piston 64*a* for applying a compressive clutch engagement force on the clutch pack 60, thereby allowing a torque transfer distribution between the output axle shafts 20*a* and 20*b* through the clutch casing 58. In other words, when the pressurized fluid is supplied into the piston pressure chamber 64*c*, the piston 64*a* exerts a compressive clutch engagement force on the clutch pack 60 so as to limit speed differentiation between the output axle shaft 20*a* and the differential case 17, thus, subsequently, between the output axle shafts 20*a* and 20*b*. The amount of torque transfer is progressive and continuously variable and is proportional to the magnitude of the clutch engagement force exerted by the piston 64*a* on the clutch pack 60 which, in turn, is a function of the fluid pressure within the piston chamber 64*c*. Moreover, the magnitude of the fluid pressure within piston pressure chamber 64*c*, as delivered thereto by the hydraulic pump 62, is largely a function of the speed differential between the output axle shaft 20*a* and the differential case 17, or between the output axle shafts 20*a* and 20*b*.

As noted above, in order to control the fluid pressure within the piston pressure chamber 64*c* and, subsequently, the output torque distribution of the torque-coupling device 16, the hydraulic clutch actuator 56 is provided with the variable pressure relief valve assembly 66. As illustrated in detail in FIG. 7, the variable pressure relief valve assembly 66 according to the present invention is in the form of an electro-magnetic valve assembly disposed within the clutch casing 58 and comprises a pressure relief check valve 68 controlled by an electro-magnetic actuator 70 that may be any appropriate electro-magnetic device well known in the art, such as a solenoid. Alternatively, the variable pressure relief valve assembly 66 may include two or more pressure relief check valve.

The check valve 68 comprises a fluid relief passageway 72 that is in fluid communication with the piston pressure chamber 64*c*, a substantially conical valve seat 74 that is in open communication with the passageway 72, and a spherical valve closure member 76 adapted to seat in the valve seat 74 for sealing the fluid relief passageway 72. It will be appreciated that the valve closure member 76 may be in any appropriate form other than spherical, such as conical. The valve seat 74 is formed in the clutch casing 58. The valve closure member 76 is movable between a closed position when the valve closure member 76 engages the valve seat 74 (as shown in FIG. 7), and an open position when the valve closure member 76 is axially spaced from the valve seat 74.

The electro-magnetic actuator 70 comprises a substantially annular coil housing 78, a coil winding 80 wound about the coil housing 78, and a substantially annular armature 82 axially movable in the direction of the axis 21. The armature 82 is coaxial to the coil winding 80 and is radially spaced from the coil housing 78, thus defining an air gap 84. The coil housing 78 is supported by the clutch casing 58 substantially coaxially to the axis 21 through a coil housing bushing 79 for rotation relative to the clutch casing 58. At the same time, the coil housing 78 is non-rotatable relative to the coupling housing 52. The coil housing 78 is preferably formed of a single-piece magnetically permeable material, such as conventional ferromagnetic materials. Alternatively, the coil housing 78 may be formed of a plurality of laminations of the magnetically permeable material. The coil housing bushing 79 is made of any appropriate non-magnetic material well known to those skilled in the art. In order to non-rotatably secure the coil housing 78 to the coupling housing 52, an anti-rotation pin 85 is employed for non-rotatably coupling the coil housing 78 to an anti-rotation plate 86 fixed to the coupling housing 52.

The annular armature 82 is supported within an armature bushing 88 for axially movement in the direction of the axis 21. The armature bushing 88 is non-rotatably mounted to clutch casing 58 by any appropriate means, such as press-fitting, adhesive bonding, etc. Preferably, the armature bushing 88 is made of any appropriate non-magnetic material well known to those skilled in the art.

Figure 7:
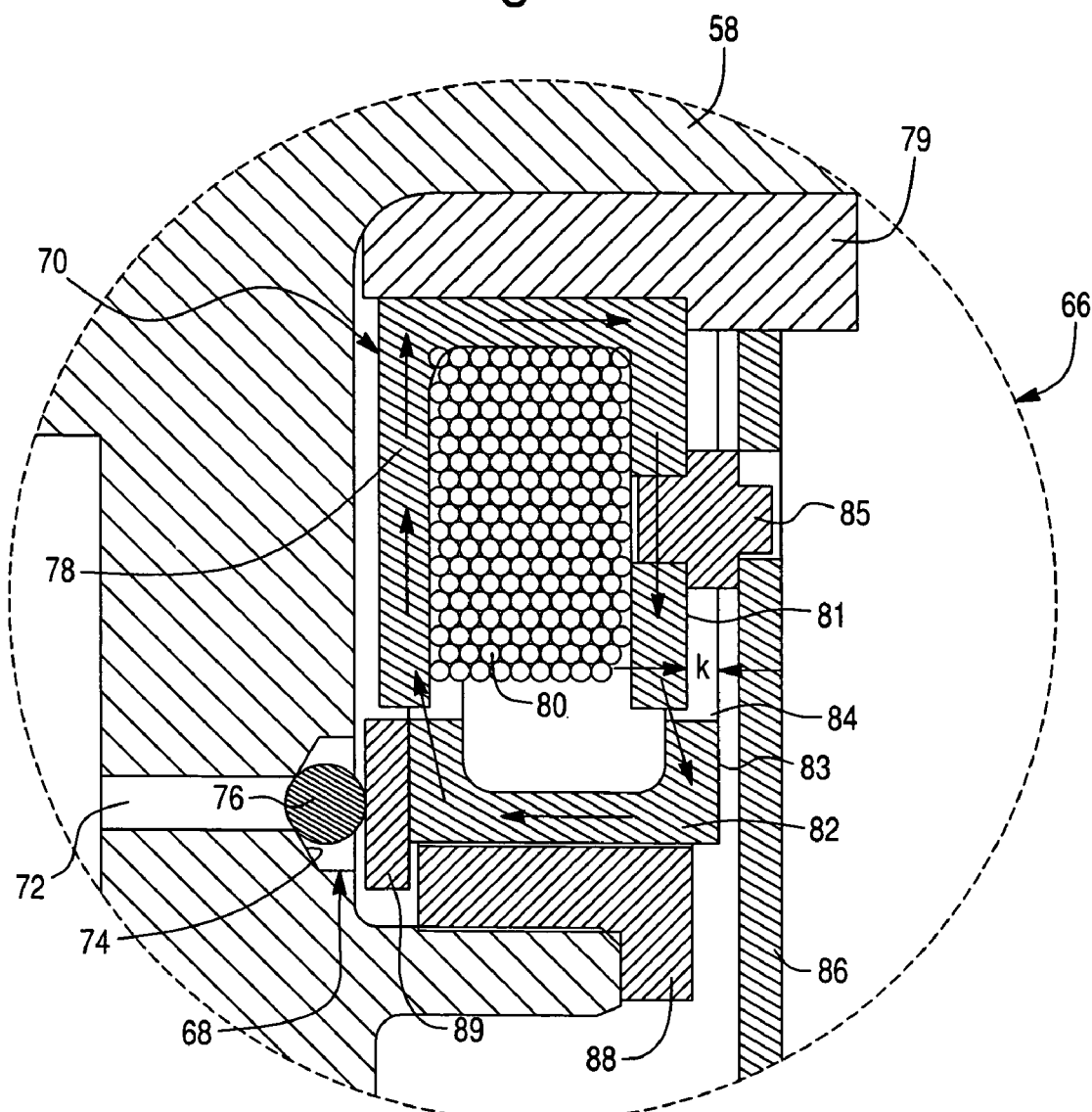
FIG. 7 is an enlarged partial sectional view of a variable pressure relief valve assembly in accordance with the preferred embodiment of the present invention.

In the exemplary embodiment illustrated in FIGS. 6 and 7, the armature 82 is disposed outside the coil winding 80 of the electro-magnetic actuator 70. Alternatively, the armature 52 may be disposed within the coil winding 80.

The valve closure member 76 is urged and held in place by against the valve seat 74 by an actuator plate 89. In turn, the actuator plate 89 is adapted to engage the armature 82 of the electro-magnetic actuator 70 disposed outside the coil winding 80 thereof. Preferably, the actuator plate 89 is in the shape of an annular segment of approximately 15° and is made of any appropriate non-magnetic material well known to those skilled in the art. Furthermore, the actuator plate 89 is fastened to the armature 82 by any appropriate means known in the art, such as threaded connectors, adhesive bonding, etc.

When electrical current is supplied to the coil winding 80, a magnetic flux is caused to flow through the armature 82. The magnetic flux creates an axial force that axially displaces the armature 82 relative to the coil winding 80. The armature 82 moves the actuator plate 89, which, in turn, urges the valve member 76 upon the valve seat 74 with a predetermined axial retaining force that is a function of the electrical current supplied to the coil winding 80. It will be appreciated by those skilled in the art that the pressurized hydraulic fluid will not flow through the pressure relief valve 68 until the hydraulic pressure generated by the gerotor pump 62 results in a reaction force larger than the axial retaining force exerted to the annature 82 by the magnetic flux generated by the coil winding 80, thereby pushing the valve closure member 76 out of the valve seat 74. Therefore, such an arrangement creates a relief valve with a release pressure that is a function of the current supplied to the coil winding 80, and provides a predetermined pressure limit in the hydraulic system. Thus, the variable pressure relief valve assembly 66 selectively sets the release pressure of the pressure relief valve 68 based on the magnitude of the electrical current supplied to the coil winding 80 and, subsequently, defines the magnitude of the pressure within the piston pressure chamber 64*c*.

When a maximum current is applied to the coil winding 80 of the solenoid actuator 70, the retaining force of the pressure relief check valve 68 is at its maximum, thus a maximum release pressure is provided by the pressure relief check valve 68. In this configuration, the maximum pressure attainable within the piston pressure chamber 64*c* is sufficient to fully actuate the hydraulic clutch pack 60 which results in providing the limited slip function in the differential assembly 14, and the limited slip feature is in the fully "ON" condition.

The pressure limit of the pressure relief valve 68, i.e. the release pressure of the pressure relief valve 68, can be adjusted by controlling the current applied to the coil winding 80 of the electro-magnetic actuator 70.

As less current is applied to the coil winding 80, less axial retaining force is exerted to the relief valve 68, thus the less is the release pressure provided by the relief valve 68. This results in an adjustment mechanism for lowering the maximum system pressure attainable within the piston pressure chamber 64*c*.

When a minimum current is applied to the coil winding 80 of the solenoid actuator 70, the retaining force of the pressure relief valve 68 is at its minimum, thus a minimum release pressure is provided by the relief valve 68. In this configuration, the limited slip feature is in the fully "OFF" condition in that the maximum pressure which can be obtained in the piston pressure chamber 64*c* is not high enough to engage the clutch pack 60, essentially disabling the limited slip feature of the differential assembly 14 without affecting the differential capability.

In between the "ON" and "OFF" conditions of the differential assembly 14 the release pressure of the relief valve 68 may be set at any value by modulating the current applied to the coil winding 80 of the solenoid actuator 70. This provides the differential assembly 14 with a variable maximum pressure limit in which the amount of the limited slip available to the differential assembly 14 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

It will be appreciated by those skilled in the art that the armature 82 may have any appropriate shape in the cross-section. Preferably, as illustrated in the exemplary embodiment of FIG. 7, the armature 82 has a generally U-shaped cross-section with magnetic poles facing the coil winding 80, similar to those used in reluctance electric motors. Moreover, the mutual geometric arrangement of the armature 82 and the coil housing 78 is such as to maintain a substantially constant axial force applied upon the valve closure member 76 by the electro-magnetic actuator 70 as it moves from its closed to open position. This is achieved by maintaining a proper "off-set" between the armature 82 and the coil housing 78 (and, consequently, the coil winding 80). The term "off-set" is determined here as an amount of misalignment between the armature 82 and the coil housing 78, or a distance k between an outward face 81 of the coil housing 78 and an outward face 83 of the armature 82, as illustrated in of FIG. 7.

FIG. 8 depicts a graph showing the axial force applied upon the valve closure member 76 by the electro-magnetic actuator 70 as a function of the "off-set" distance k while a constant magnitude of the electric current is supplied to the coil winding 80. The graph is in the form of a curved line F having a substantially "flat" section $F_c$ wherein the axial force varies insignificantly with respect to the "off-set" distance k. However, operation outside of this section $F_c$ results in an abrupt change of the axial force. Thus, while the electro-magnetic actuator 70 of the relief valve assembly 66 is operated in the "flat" section $F_c$, the axial force applied upon the valve closure member 76 by the electro-magnetic actuator 70 is substantially constant as it moves from its closed to open position, and is a function of the electrical current supplied to the coil winding 80. On the other hand, operation outside of this "flat" section $F_c$ results in the axial force being a function of both the current and the "off-set" distance k that would make control of the variable pressure relief valve much more difficult requiring a closed loop feedback as to the valve's "off-set". Other, more traditional solenoid pole designs do not provide this "flat" section in the axial force versus "off-set" distance curve.

For the above described reason, the electro-magnetic actuator 70 in accordance with the preferred embodiment of the present invention is arranged to provide the "off-set" distance k between the coil housing 78 and the armature 82 within the "flat" section $F_c$ of the axial force versus "off-set" distance curve so as to ensure that the axial force applied upon the valve closure member 76 by the electro-magnetic actuator 70 is substantially constant as it moves from its closed to open position, and is a function only of the electrical current supplied to the coil winding 80.

Therefore, the transaxle unit in accordance with the present invention represents a novel arrangement of the FWD transaxle unit including the limited-slip differential assembly and the integrated PTU and the electronically controlled torque-coupling device provided with an electro-magnetic actuator for activating a variable pressure relief valve for allowing both limited slip and open differential capabilities. The FWD transaxle unit according to the present invention allows to readily modify a front-wheel-drive (FWD) powertrain architecture into an all-wheel-drive (AWD) minimizes the FWD transaxle unit redesign, tooling and manufacturing expenses, and provides active control of the differential assembly. The integrated power take-off unit and a torque-coupling device of the present invention can be integrated into the transaxle unit without any substantial modification thereof. Moreover, the torque capacity of the torque-coupling device can be actively controlled electronically to match various vehicle operating conditions.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A transaxle unit comprising:
   a differential assembly having a differential mechanism disposed in a differential case and two opposite output axle shafts outwardly extending from said differential case;
   a power take-off unit drivingly coupled to said differential case;
   a torque-coupling device for selectively restricting differential rotation of said differential mechanism;
   said torque-coupling device including:
      a friction clutch assembly for selectively frictionally engaging and disengaging said differential case and one of said output axle shafts, said clutch assembly comprising at least one first friction member non-rotatably coupled to said differential case and at least one second friction member non-rotatably coupled to one of said output shafts, said friction members being frictionally engageable with one another; and
      a hydraulic clutch actuator for selectively frictionally loading said friction clutch assembly, said actuator comprising:
         a hydraulic pump to generate a hydraulic pressure to frictionally load said friction clutch assembly; and
         a variable pressure relief valve assembly fluidly communicating with said hydraulic pump to selectively control said hydraulic pressure, said variable pressure relief valve assembly including a valve closure member, a valve seat complementary to said valve closure member, and an electro-magnetic actuator for engaging said valve closure member and generating a variable electro-magnetic force urging said valve closure member against said valve seat so as to selectively vary a release pressure of said pressure relief valve assembly based on a magnitude of an electric current supplied to said electro-magnetic actuator;
   wherein said power take-off unit is mounted between said differential assembly and said torque-coupling device.

2. The transaxle unit as defined in claim 1, further comprising a differential housing rotatably supporting said differential case therewithin and a power take-off housing supporting said power take-off unit therewithin; and wherein said power take-off housing is secured to said differential housing.

3. The transaxle unit as defined in claim 2, further comprising a coupling housing rotatably supporting said torque-coupling device therewithin; said coupling housing is secured to said power take-off housing.

4. The transaxle unit as defined in claim 1, wherein said differential assembly and said torque-coupling device are mounted substantially coaxially.

5. The transaxle unit as defined in claim 1, wherein said torque-coupling device is mounted about one of said output axle shafts.

6. The transaxle unit as defined in claim 1, wherein said at least one first friction member and said at least one second friction member are mounted substantially coaxially with said differential case of said differential assembly.

7. The transaxle unit as defined in claim 1, wherein said variable pressure relief valve assembly is adapted to selectively set a maximum hydraulic pressure generated by said hydraulic pump between a maximum release pressure and a minimum release pressure.

8. The transaxle unit as defined in claim 7, wherein said minimum release pressure is at a level that prevents actuation of said friction clutch assembly.

9. The transaxle unit as defined in claim 7, wherein said maximum release pressure is at a level that enables complete actuation of said friction clutch assembly.

10. The transaxle unit as defined in claim 7, wherein said maximum hydraulic pressure generated by said hydraulic pump is adjustable between said minimum release pressure and said maximum release pressure so as to enable partial actuation of said friction clutch assembly.

11. The transaxle unit as defined in claim 1, wherein said electro-magnetic actuator includes a coil winding and an armature axially movable relative thereto in response to a magnetic flux generated by said coil winding when said electrical current is supplied thereto, said armature engages said valve closure member and urges said valve closure member against said valve seat with an axial force determined by said magnitude of said electric current for selectively setting up said release pressure of said valve closure member.

12. The transaxle unit as defined in claim 11, wherein said coil winding is coaxial to an axis of rotation of said differential case.

13. The transaxle unit as defined in claim 1, wherein said hydraulic clutch actuator further including a piston assembly disposed between said hydraulic pump and said friction clutch assembly and defining a pressure chamber, wherein said variable pressure relief valve assembly selectively controls a maximum hydraulic pressure attainable within said pressure chamber.

14. The transaxle unit as defined in claim 1, wherein said variable pressure relief valve assembly selectively controls said hydraulic pressure generated by said hydraulic pump in response to at least one vehicle parameter.

15. The transaxle unit as defined in claim 14, wherein said at least one vehicle parameter is selected from the group consisting of a vehicle speed, a wheel speed difference, a vehicle yaw rate, a steering angle, an engine throttle position, a vehicle lateral acceleration, a brake application, an ice detection, a moisture detection, a driveline configuration, an anti-lock brake system/traction control system actuation, and a vehicle yaw stability control system actuation.

16. A transaxle unit comprising:
a differential assembly having a differential mechanism disposed in a differential case and two opposite output axle shafts outwardly extending from said differential case;
a power take-off unit drivingly coupled to said differential case;
a torque-coupling device for selectively restricting differential rotation of said differential mechanism;
said torque-coupling device including:
a friction clutch assembly for selectively frictionally engaging and disengaging said differential case and one of said output axle shafts, said clutch assembly comprising at least one first friction member non-rotatably coupled to said differential case and at least one second friction member non-rotatably coupled to one of said output shafts, said friction members being frictionally engageable with one another; and
a hydraulic clutch actuator for selectively frictionally loading said friction clutch assembly, said actuator comprising:
a hydraulic pump to generate a hydraulic pressure to frictionally load said friction clutch assembly; and
a variable pressure relief valve assembly fluidly communicating with said hydraulic pump to selectively control said hydraulic pressure, said variable pressure relief valve assembly including a valve closure member, a valve seat complementary to said valve closure member, and an electro-magnetic actuator for engaging said valve closure member and generating a variable electro-magnetic force urging said valve closure member against said valve seat so as to selectively vary a release pressure of said pressure relief valve assembly based on a magnitude of an electric current supplied to said electro-magnetic actuator; and
wherein said friction clutch assembly includes a clutch casing housing, said at least one first friction member and said at least one second friction member, said clutch casing non-rotatably couples said differential case to said at least one first friction member, and said power take-off unit includes a first transfer gear non-rotatably mounted to a transfer shaft, said transfer shaft mounted about one of said output axle shafts to non-rotatably couple said differential case to said clutch casing.

17. The transaxle unit as defined in claim 16, wherein said hydraulic pump is disposed within said clutch casing and generates said hydraulic pressure in response to relative rotation between said differential case and said at least one output axle shaft.

18. The transaxle unit as defined in claim 17, wherein said pump is a gerotor pump.

* * * * *